Aug. 10, 1954
J. E. DAVIS
2,686,101
APPARATUS AND METHOD FOR REPRODUCING SURFACE CONTOURS
Filed June 11, 1951
6 Sheets-Sheet 1
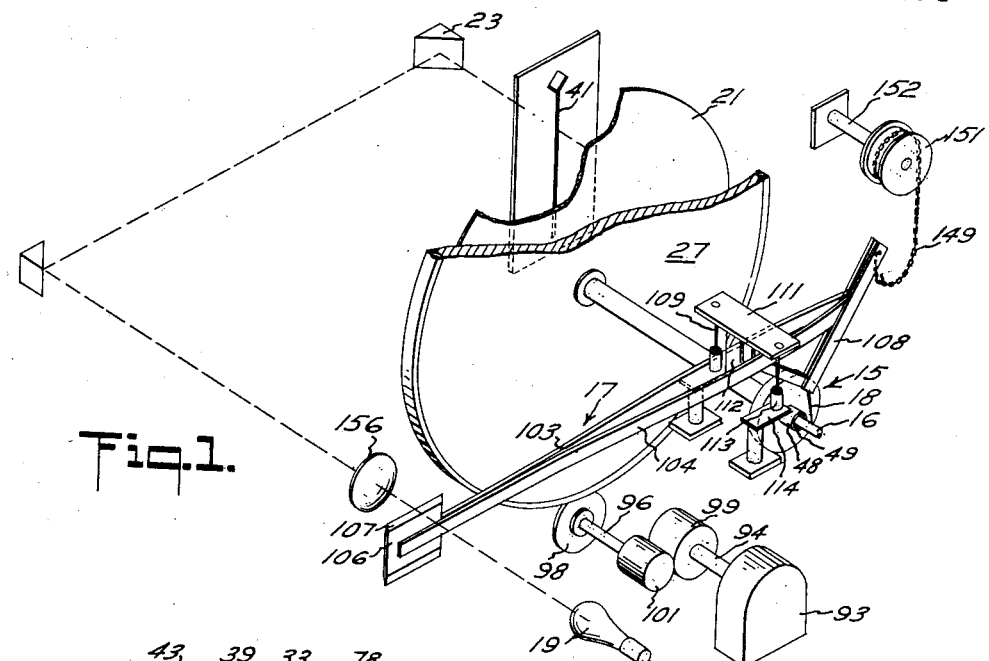
Fig.1.
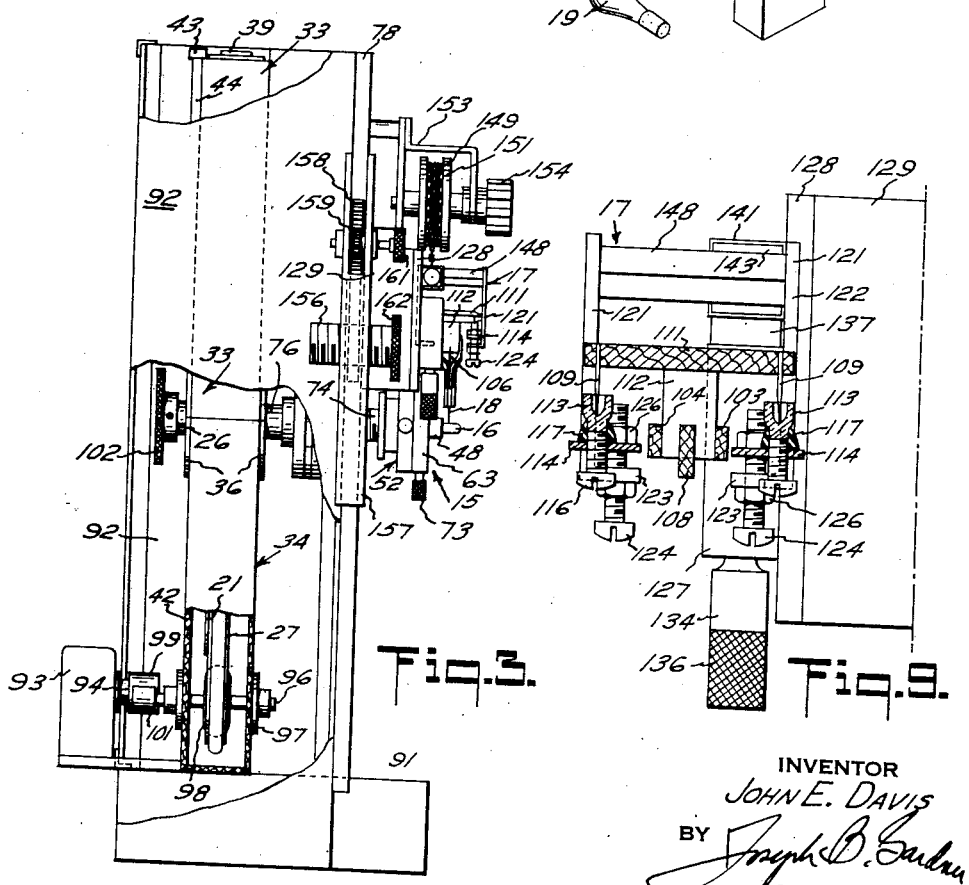
Fig.3.
Fig.9.
INVENTOR
JOHN E. DAVIS
BY
ATTORNEY Aug. 10, 1954    J. E. DAVIS    2,686,101
APPARATUS AND METHOD FOR REPRODUCING SURFACE CONTOURS
Filed June 11, 1951    6 Sheets-Sheet 2

INVENTOR
JOHN E. DAVIS
BY
ATTORNEY

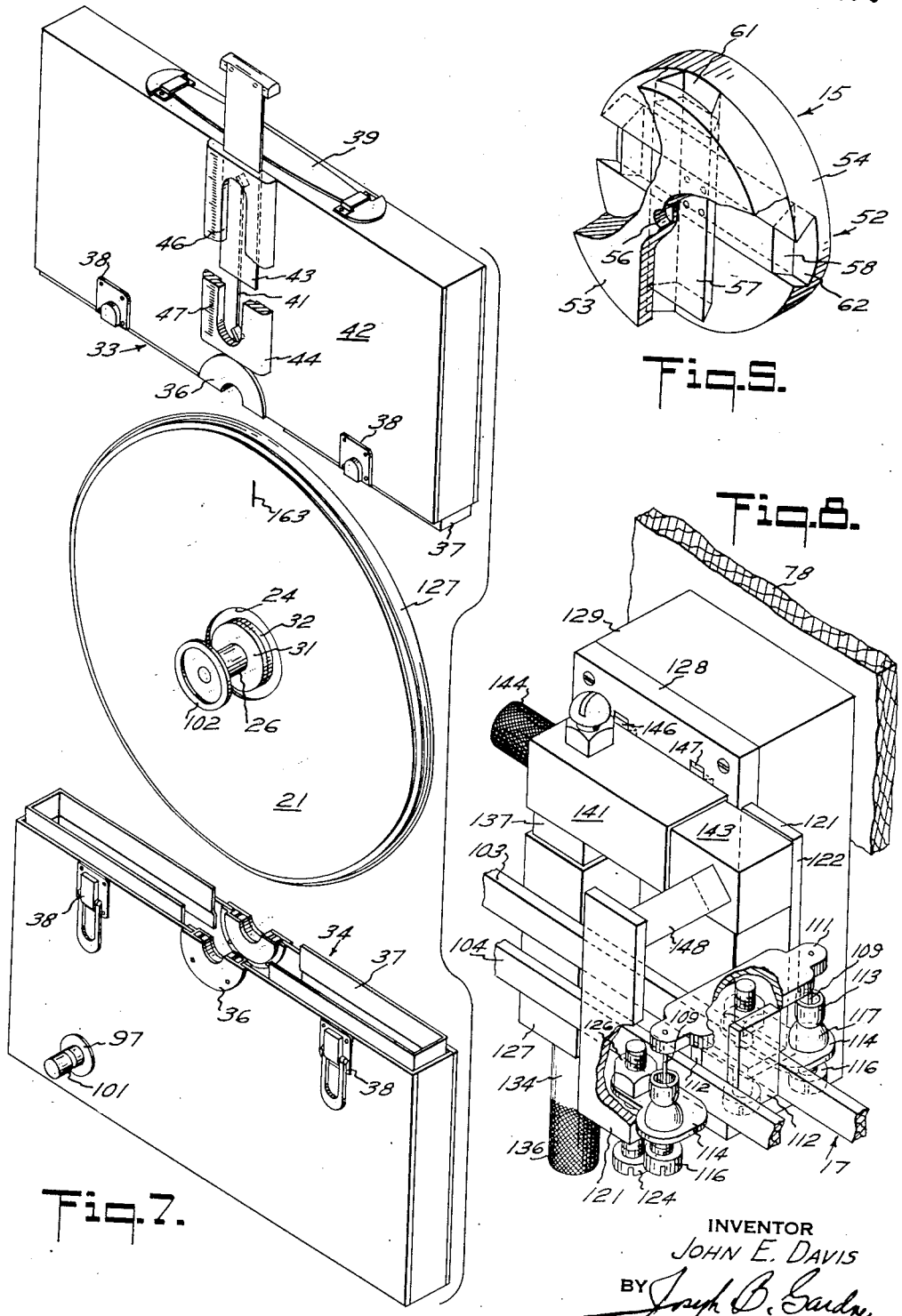

Aug. 10, 1954    J. E. DAVIS    2,686,101
APPARATUS AND METHOD FOR REPRODUCING SURFACE CONTOURS
Filed June 11, 1951    6 Sheets-Sheet 4

INVENTOR
JOHN E. DAVIS
BY Joseph B. Gardner
ATTORNEY

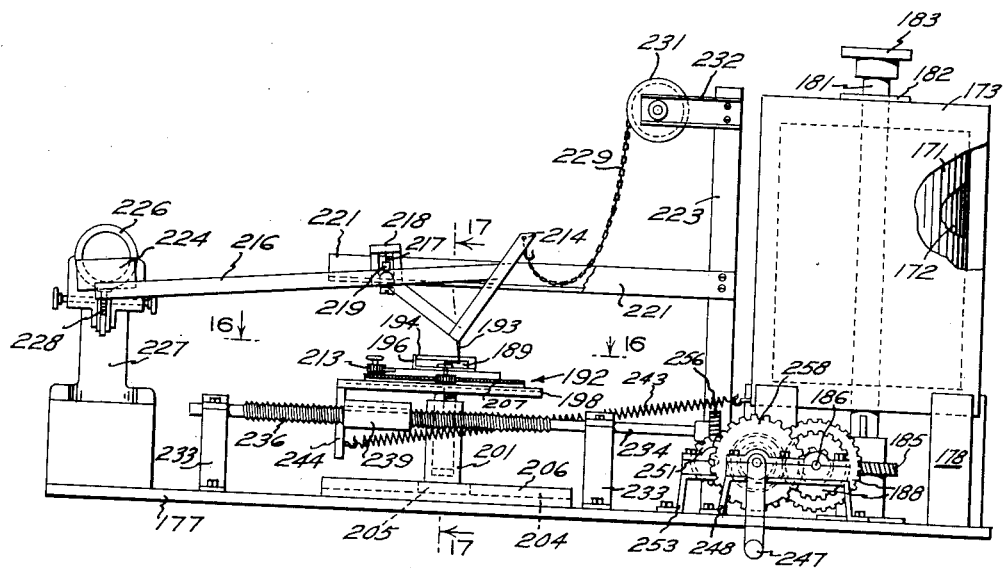

Patented Aug. 10, 1954

2,686,101

UNITED STATES PATENT OFFICE 2,686,101

APPARATUS AND METHOD FOR REPRODUCING SURFACE CONTOURS

John E. Davis, Oakland, Calif.

Application June 11, 1951, Serial No. 231,031

20 Claims. (Cl. 346—108)

This invention relates to apparatus for tracing, measuring and reproducing variations in surface contours on different types of specimens, and is particularly directed to devices and methods for accurately charting microscopic contour variations appearing on such specimens.

For many years a need has existed for some type of apparatus which could readily analyze surface irregularities. Such apparatus is not only essential for examination of the surfaces of certain precision tools or equipment, but is of extreme importance in the fields of criminology in which technicians are often required to examine, analyze and compare markings produced by certain cutting and scraping tools on some object, or the striations created on bullets after being fired through rifled bores. Heretofore, it has been the standard practice of persons engaged in such work to use the familiar comparison microscope in which the evidentiary bullet or other device may be compared with a test bullet, the markings of each specimen may be compared, and a person skilled in the field may determine whether or not the marks are substantially identical and thereby ascertain the possibility of whether the same gun or tool created the markings on both specimens. Comparatively recently, some advancement has been made in the field of surface or contour analysis by the use of profilographs or similar apparatus in which surface depressions and elevations are magnified and recorded. In this manner, a convenient picture is obtained for purpose of analysis and/or comparison with other pictures for determining similarities and distinctions. These devices, while constituting an improvement over previously used methods and machines, possessed a number of disadvantageous features, among them being their high cost of manufacture and maintenance, complicated structural arrangements leading to breakdowns and possibly incorrect results, inability to accurately produce a true cross-sectional contour of a bullet or other cylindrical or spherical object, distortion or reproduction, cutting or other injury to the object being analyzed, as well as other factors contributing to their limited utility, especially for police investigation work. Although the present application may give particular emphasis to the use of the apparatus and method of my invention in connection with the field of criminology, it will be apparent to those skilled in the art, that such discussion is only for the purpose of explanation, as the apparatus presently to be described may be successfully utilized whenever it is desired to analyze or compare minute contour variations on either flat or cylindrically shaped specimens.

An object of the present invention is to provide apparatus for reproducing on photographic film or other media the surface contour of an object, and in which the vertical irregularities in such contour may be greatly amplified independently of the degree of horizontal magnification.

Another object of the invention is to provide apparatus of the chamber described in which contour irregularities in the neighborhood of 0.0001 inch may be reproduced on a predetermined amplified scale for subsequent analysis or comparison with other reproductions.

A further object of the invention is to provide apparatus of the above type which is light weight, which contains a minimum of operating parts, which can be constructed at a reasonable cost, and which is capable of operating over extended periods of time without requiring any special servicing or other extensive repair or maintenance.

Yet another object of my invention is to provide a contour reproducing device in which the specimen is moved in timed relationship to movement of the photographic film on which the contour image is produced, and in which the image corresponds to the general shape of the specimen being tested.

A still further object of the invention is to provide apparatus of the type described which will reproduce the amplified contour irregularities of any desired portion of a specimen, and which may be rerun over the same portion at any time during the operation.

Another object of the invention is to provide apparatus of the above character in which the tracing mechanism proceeds over the specimen contour using a continuous straight line procedure rather than scanning the contour as is done in some prior art devices.

Still another object of the invention is to provide apparatus of the type described in which repeated reproductions of the surface contour may be made without creating new markings on the specimen and without requiring the use of expensive electronic equipment.

A further object of the invention is to provide apparatus of the character referred to which will permit analysis of specimen contours which possess substantially large variations or irregular features.

Another object of this invention is to provide a device in which a pair of parallel spaced images of the contour of an object may be produced on a single film whereby a careful check may be maintained as to any possible inaccuracies existing in the mechanism or in the original image.

A further object of my invention is to provide a process for reproducing surface contours of some object in which the photographic film is arranged to intercept light rays which are caused to fluctuate according to the irregularities appearing on the contour of the specimen being analysed, and in which the film is caused to move in synchronism with the specimen.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set fotrh in the claims.

Referring to the drawings:

Figure 1 is a front perspective view, diagrammatic in character, illustrating the principles of operation of the apparatus of my invention.

Figure 3 is an end elevational view, portions of the drawing being broken away in order to more clearly disclose the details of internal construction.

Figure 5 is a perspective view of a portion of the centering apparatus for the bullet holding mechanism.

Figure 7 is a rear perspective view of the film holder and casing.

Figure 8 is a perspective view of the adjustably positioned fulcrum for the lever mechanism of the present invention.

Figure 9 is a cross-sectional view taken substantially in the plane indicated by the line 9—9 of Figure 2.

Figure 14 is a front elevational view of another embodiment of the invention utilized in making substantially flat surface analysis.

Figure 15 is a plan view of the structure disclosed in Figure 14.

Figure 2:
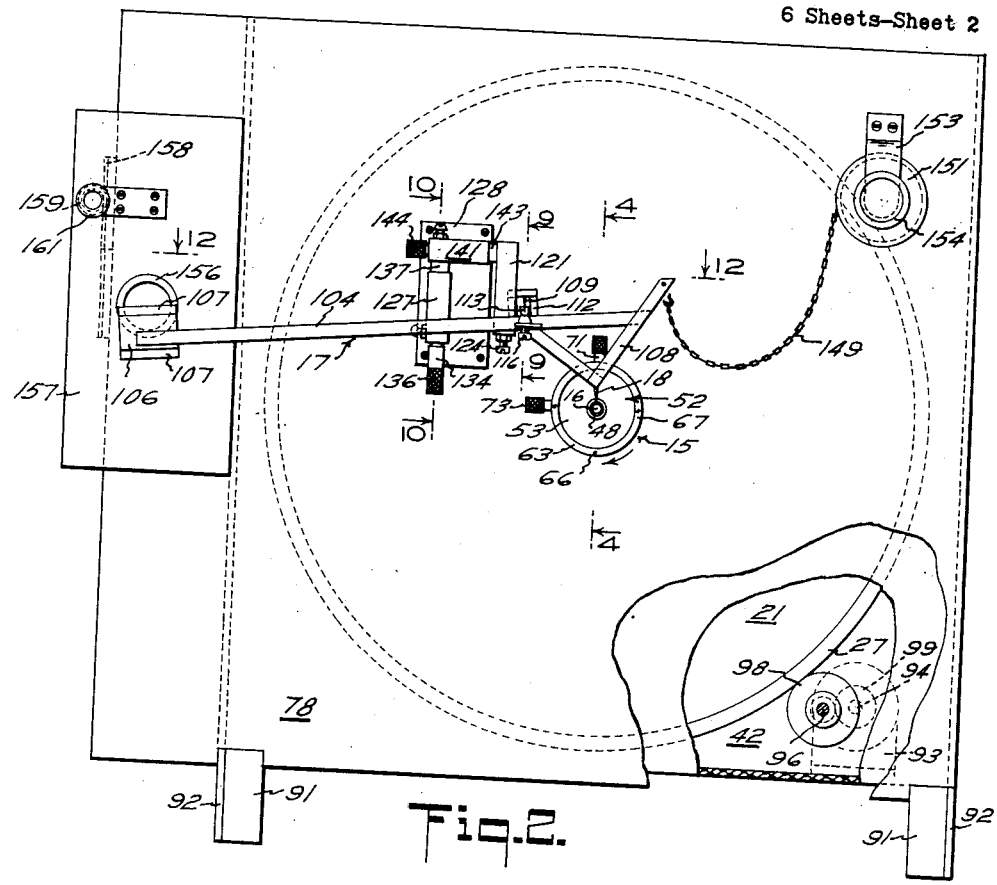
Figure 2 is a front elevational view of the apparatus.
Figure 4:
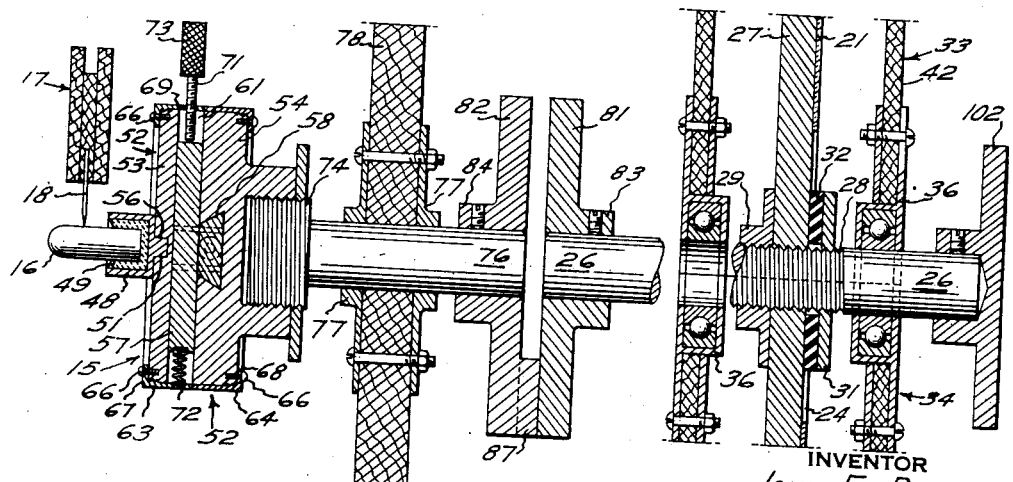
Figure 4 is a sectional view taken in the plane indicated by the line 4—4 of Figure 2.
Figure 12:
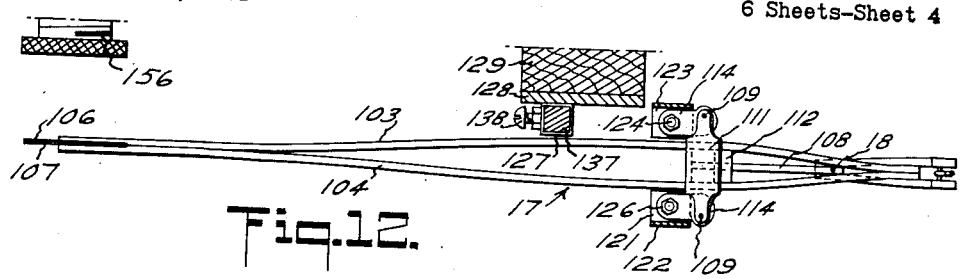
Figure 12 is a plan sectional view taken along the plane 12—12 of Figure 2.
Figure 6:
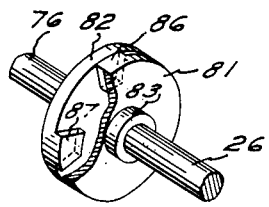
Figure 6 is a perspective view of the clutch arrangement interposed between the specimen and the photographic film.

In broad terms, the apparatus of the principal embodiment of the invention as disclosed in Figures 1 through 13 of the drawings comprises mechanism for holding a spherical or cylindrical object such as a bullet, a tracing device arranged to continuously follow the peripheral surface of the object as the latter is rotated, means for amplifying the contour irregularities as indicated by the tracing device, and means for recording such amplified irregularities in proper relative positions on photographic film. The embodiment disclosed in Figures 14 and 15 is particularly adapted for examination of relatively flat surfaces, and likewise utilizes a holding mechanism and a comparable tracer and amplifying means, the chief distinctions between the embodiments lying in the method of moving the object past the tracing apparatus and the arrangment of the photographic film on which the contours are reproduced. In both embodiments, the amplification of contour irregularities preferably occurs in two stages, the initial stage resulting from a mechanical advantage created by the arrangement of the tracing mechanism, and the latter being occasioned by the use of appropriate lenses, and as will be more fully described, each of these arrangements may be selectively varied to produce the desired degree of contour magnification without enlargement of the general shape of the specimen.

Apparatus to carry out the foregoing might be constructed in a number of different ways, but I prefer to utilize the arrangement of parts disclosed in Figure 1 of the drawing which possesses all of the advantageous characteristics set forth in the objects and features of the invention. The apparatus includes holding means 15 for a bullet 16 or other specimen to be analyzed. A lever, generally indicated by the numeral 17 is equipped adjacent one end thereof with a tracer arm, preferably in the form of a needle 18, designed to constantly engage the peripheral surface of the specimen as the latter is rotated, the other end of the lever being arranged to intercept a beam of light from a light source 19. As will be seen, the light beam is projected onto an annular sheet of photographic film 21 which is rotated in synchronism with the specimen, and due to the bidirectional linear movement of the tracer needle as the latter rides over the surface irregularities of the specimen, portions of the light beam will be prevented from striking the film, with the result that the image or unexposed portion of the film will exactly conform to the cross-sectional contour of the specimen but with amplified contour variations. To simplify and make the construction more compact, it is preferable to mount the specimen and film 21 in axial alignment with the specimen, and it is therefore necessary to provide suitable prisms or mirrors 22 and 23 to properly reflect the light beam from its source to the film, although it is believed clear that if desired, the film could be arranged in alignment with the light source and thus dispense with the necessity of such prisms or other refractory media.

Figure 13:
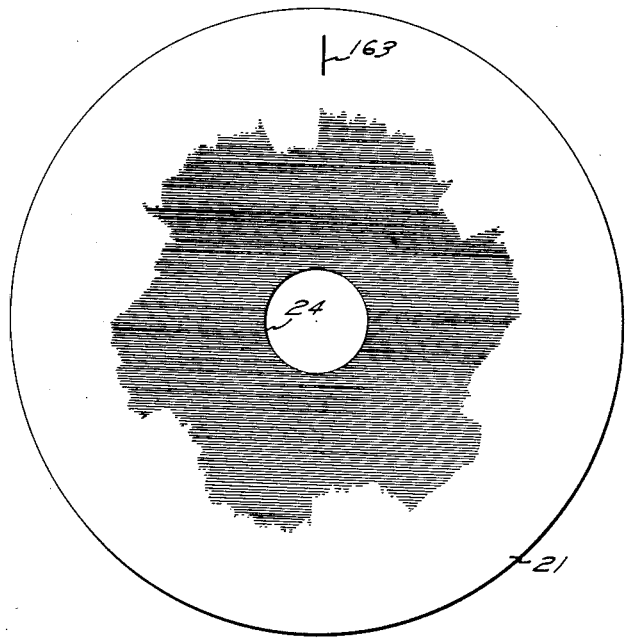
Figure 13 is representative of a film produced by the present apparatus and indicating striation on a typical bullet.
Figure 18:
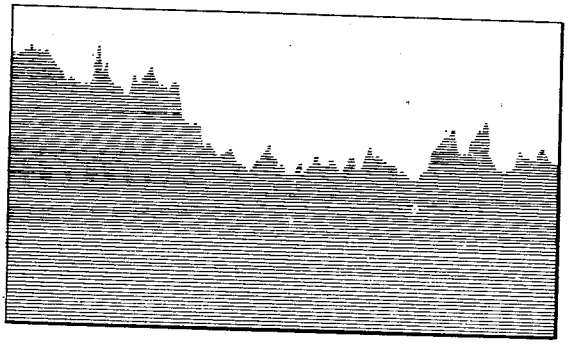
Figure 18 is an elevational view of the image bearing film illustrating a sample flat surface contour.

As will best be seen in Figure 13, the film sheet 21 is of generally circular form and is provided with a centrally disposed opening 24 which is arranged to fit over a rear shaft 26, the latter extending substantially horizontally of the apparatus. Mounted for rotation with the shaft 26 is a disk-like film-supporting element 27, the connection between the shaft and element being made in any convenient manner such as by providing threads 28 intermediate the ends of the shaft and releasably securing the film disk thereto by clamping the latter between a nut 29 threadedly engageable with the shaft and a collar member 31 provided with a suitable gasket 32.

Photographic film must be maintained in darkness to prevent accidental exposure thereof, and it is therefore necessary to provide a suitable housing for the disk 27 and its associated film. With particular reference to Figure 7, it will be seen that the housing comprises a pair of substantially symmetrical rectangularly shaped boxlike sections generally indicated by the numerals 33 and 34, the open ends of each of the sections cooperating and interfitting to provide a substantially enclosed housing for the film. Adjacent the open ends on each side panel of the sections is mounted one half of a split bearing 36, the adjacent halves from the respective sections cooperating to define a bearing seat for the shaft 26. The sections 33 and 34 are provided with generally conventional interfitting members 37 to prevent light from entering the housing along the horizontally disposed juncture line of the latter, and to releasably secure the sections together, suitable latch fasteners 38 are disposed adjacent the open ends of the sections and arranged to be interconnected when the sections are placed in their immediately adjacent position. By constructing the housing and shaft support in this manner, it is a simple matter to either place or remove the film 21 from the disk 27. To perform the foregoing, it is only necessary to release the latches 38 and raise the upper housing section 33 by means of handle 39, the shaft 26 and the film disk then being readily available for lifting from the lower split bearing supports. The film may be releasably secured to the disk 27 by means of any suitable adhesive and as the disk is rotated on the bearings 36, different portions of the film will be sequentially passed opposite and adjacent an exposure slot 41 disposed in the rear panel 42 of the housing section 33. By providing a slide element 43 adjacent panel 42 and over the slot 41, light entering through the latter may be either completely cut off or controlled to vary the diametrical extent of the exposed portion of the film. The element 43 merely comprises a flat rectangular plate arranged for vertical movement in a bracket 44 provided with a slot 46 aligned with the slot 41. If desired, suitable indicia 47 may be imprinted on the bracket whereby the operator may readily ascertain the size of the resultant exposed film portion.

The foregoing description has set forth the details of construction of the rear portion or film supporting mechanism of my invention, and I will now describe the manner in which the bullet or other specimen is held in the apparatus and the means whereby the specimen and film may be simultaneously rotated in order to produce on the film proper angular relationships of all surface irregularities appearing on the specimen.

The bullet 16 or similar specimen is disposed in general axial alignment with the rear shaft 26 and may be releasably secured for rotation in such alignment by numerous methods, such as by a conventional chuck device. However, in order to simplify the apparatus, as well as to prevent mutilation of the specimen, I prefer to mount the bullet in a cup-like member 48 in which is placed a quantity of wax 49 or similar pliable material, such material furnishing a support for the bullet. Member 48 is provided with a stud 51 which is mounted in a centering head 52 by means of which the axial centerline of the bullet may be selectively moved in a horizontal or vertical plane. As here shown, and with particular reference to Figures 4 and 5 of the drawings, the centering head comprises a pair of adjacent disks 53 and 54 which are generally axially aligned with the shaft 26 and bullet 16. The front disk 53 is provided with an aperture 56 to receive the stud 51 of the bullet holder, and a pair of normally related dove tailed tongues 57 and 58 are secured together and arranged for axial sliding movement in correspondingly shaped dove tailed grooves 61 and 62 formed in disks 53 and 54 respectively. The distal ends of the tongues terminate short of the ends of the grooves and annular rings 63 and 64 are secured to the peripheral surfaces of the disks by means of screws 66 or the like passing through flanges 67 and 68. Each of the rings is provided with a threaded aperture 69 arranged to receive a bolt 71 whose end bears against an end of its associated dove tailed tongue. Although it would be possible to use two diametrically opposed bolts for positioning the tongues, I prefer to utilize only one bolt on each tongue, a spring 72 being interposed between the other end of the tongue and the annular ring. The bolt 71 is here shown as being provided with an elongated knurled handle portion 73 for ease in making the necessary adjustments. From the foregoing it is believed apparent that the bullet may be readily centered by merely tightening or loosening the two bolts 71 against spring pressure, the corresponding movement of the tongues imparting like movement to the bullet holding member 48. Various modifications could be made of the centering head as will be apparent to those skilled in the art, but for purpose of explanation, the inexpensive and simple arrangement disclosed herein is deemed adequate.

The centering head 52 is secured to the threaded end 74 of a front shaft 76, the latter being axially aligned with the rear shaft 26 and arranged to be rotated therewith. Shaft 76 is mounted for rotation in a pair of axially spaced bearings 77 secured to opposite sides of a front panel member 78 constructed of Masonite, wood or any suitable material. As previously mentioned, rear shaft 26 together with the film disk 27 is designed to be removed from the film housing for loading or unloading of the film 21, and it is therefore necessary to provide some clutch mechanism which will effect positive and direct transmission of rotary movement between the shafts 26 and 76 and at the same time permit the aforesaid removal of the former. It is also desirable to provide a clutch which will permit the film disk to be reinstalled in the identical rotational position relative to the specimen that it had prior to removal. The clutch mechanism best seen in Figures 4 and 6 comprises two axially spaced disks 81 and 82 secured to the rear and front shafts respectively by means of collars 83 through which set screws 84 are threadedly engaged to bind the collars to the shafts. The opposed faces of the disks are provided with dogs 86 and 87 and it will be evident that if the rear shaft 26 is rotated the dog 86 will engage dog 87 and effect rotation of the shaft 76 and the specimen associated therewith, but at the same time permit removal of the rear clutch and its associated shaft.

Means are provided for imparting rotary motion to at least one of said shafts. It will be seen that the front supporting panel 78 is disposed in a generally vertical plane and secured to a horizontal base member 91 and a plurality of the length of front shaft 76, and rear shaft 26. of side panels 92 forming an open backed enclosure for the film housing, the greater portion The lower film housing section 34 is arranged to seat on the base 91 in predetermined relation to front panel 78, and also mounted on the base is a suitable source of power, such as a small motor 93 with a horizontally disposed drive shaft 94. A shaft 96 is journaled in suitable bearings 97 provided adjacent the lower panel portions of film section 34, said shaft carrying a friction drive wheel 98 engageable with the periphery of the film disk 27 when the latter is seated in the film housing. Shafts 94 and 96 also respectively carry interengageable friction drive wheels 99 and 101, and in this manner, when the motor is actuated, wheel 98 will impart rotary movement to film disk 27 and rear shaft 26, the clutch arrangement imparting identical rotary movement to front shaft 76, the centering head 52, and specimen 16. Rear shaft 26 may also be manually rotated by means of a handle 102 secured to the distal end of the shaft and positioned exteriorly of the film housing.

It has been previously mentioned that as the bullet 16 and film 21 are rotated, the tracer arm needle 18 continuously engages the peripheral contour of the specimen, and by oscillating the lever arm 17, the height of light beam striking the film through the housing slot 41 will be raised and lowered in response to similar movements of the lever arm. As best seen in Figures 1 and 2, the needle 18 is angularly disposed relative to the vertical plane of the bullet so as to prevent the needle tip from sticking or binding in depressions in the bullet periphery. Lever arm 17 is preferably constructed of balsa wood or similar light weight material for greater sensitivity, with the fulcrum therefor disposed intermediate the needle 18 and the distal end of the lever at the light source. Arm 17 includes a pair of generally horizontally extending bowed strips 103 and 104, an opaque plate 106 with a knife-like edge 107 on the upper and lower surfaces being mounted on the strips in substantial registry with the light source and the prism 22. Thus, as the end of the lever moves up and down, the height of the light beam will be correspondingly decreased and increased with the resultant similarly shaped image being produced on the film. Needle 18 depends from the apex of a V-shaped bracket 108 disposed subjacent and secured to the strips 103 and 104, this bracket also functioning in the lever balance control mechanism as will be hereinafter described.

The lever arm 17 is provided with a suitable fulcrum in order to impart substantially vertical movement of the opaque shield 106 upon movement of the needle 18, and such fulcrum includes a pair of needles 109 disposed on opposite sides of the lever arm which are secured to a transversely extending bridge member 111, the latter being mounted adjacent the upper surfaces of the strip 103 and 104 in any convenient manner such as by a pair of substantially flat posts 112. The ends of the needles are supported in cuplike bearings 113, preferably constructed of glass or agate so as to decrease the friction created therebetween and increase the sensitivity of the apparatus, and as will be seen, the needle points are seated in a groove or pointed recess in the bearings. Bearings 113 are disposed transversely of the lever arm axis and are supported on a pair of similarly disposed plates 114 by means of adjustment screws 116 threadedly engaged with the plates and a mass of sealing wax 117 on the upper surface of the plate encompassing the upper end of the screws and the lower portion of the bearings. In this manner, each bearing 113 may be vertically adjusted to insure the maintenance of the bridge member 111 in a horizontal plane and to assist other parts of the mechanism presently to be described in compensating for the size of the specimen being analyzed, and at the same time permit compensatory horizontal bearing adjustment.

Figure 10:
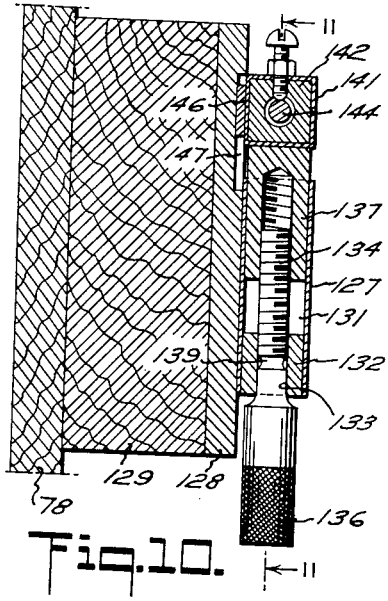
Figure 10 is a cross-sectional view taken in the plane indicated by the line 10—10 of Figure 2.
Figure 11:
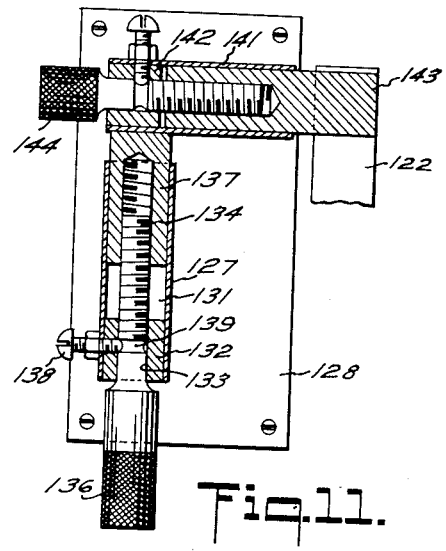
Figure 11 is a sectional view taken in the plane indicated by the line 11—11 of Figure 10.
Figure 16:
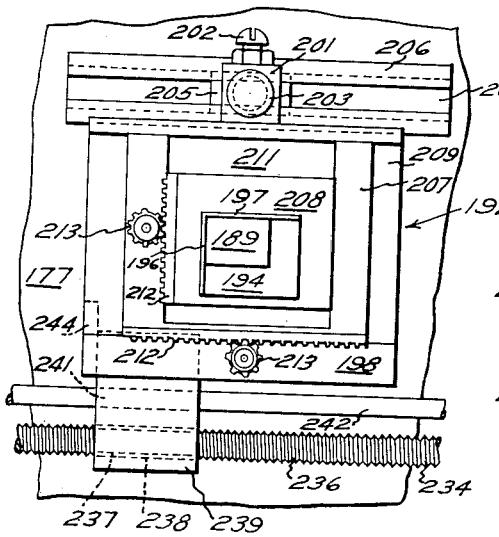
Figure 16 is a plan view taken in the plane indicated by the numerals 16—16 of Figure 14.
Figure 17:
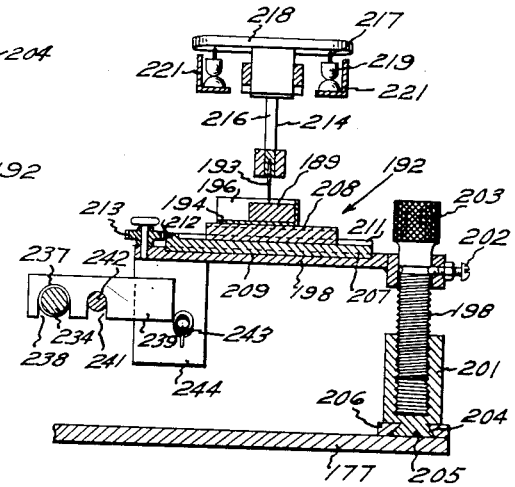
Figure 17 is a cross-sectional view taken in the plane indicated by the numerals 17—17 of Figure 14.

Means are provided for adjusting the plates 114 in both a horizontal and vertical direction to permit the aforesaid accommodation of specimens of a comparatively wide range of sizes. As here shown, each of the plates 114 is supported in a generally horizontal plane by a pair of angle brackets 121, the latter comprising vertical webs 122 and horizontal flanges 123 disposed below the plane of the plates 114. The flanges 123 are positioned subjacent the plates 114 and are arranged to support the latter by means of bolts 124 threadedly engaged with a pair of nuts 126 positioned adjacent the upper surface of plate 114, and the lower surface of flange 123 respectively, and it is believed evident that a limited amount of vertical adjustment of the plates may occur by screwing the bolts 124 up or down in the plates and flanges. In order to permit the simultaneous movement of both plates 114 and their associated bearings, instead of the individual adjustment just described, the following mechanism is utilized. With particular reference to Figures 8 and 10, it will be seen that a vertically positioned housing 127 is secured to a plate 128, the latter being mounted in parallel spaced relation to the panel member 78 by means of a spacer block 129. The chamber 131 defined by the housing 127 is substantially square in cross-sectional form and mounted adjacent the lower end thereof is a stationary block 132 provided with an axially extending aperture 133. A stud 134 having a knurled hand grip 136 extends through the aperture 133 and threadedly engages an axially movable block 137 extending beyond the upper end of the housing 127. Due to the presence of a horizontal screw 138 in block 132 which engages a peripheral groove 139 in the stud, upon rotation of the latter, the stud will be held in fixed axial position, but will cause the block 137 to selectively move upwardly or downwardly within the housing chamber. Secured to the upper end of the movable block 137 is a horizontally disposed casing 141, similar to the casing 127 and likewise including a stationary block 142, an axially movable block 143 and a knurled ended threaded stud member 144, the latter also being axially fixed so as to effect horizontal movement of the block 143. Casing 141 includes one or more dove-tailed tongues 146 arranged for vertical movement only in similarly shaped grooves 147 in the plate 128. Block 143 extends beyond the end of the casing 141 and is secured to the flanges 122 of the angle brackets, one of the latter being connected to the block by means of a transverse brace 148. In place of the casing and blocks illustrated, a rack and pinion arrangement could be substituted therefor which would permit the combination vertical and horizontal movement for the lever hanger.

From the foregoing, it will be understood that the bearings 113 which support the needles 109 and act as a fulcrum for the lever arm may be first moved in a vertical direction by rotation of stud 136 which effects a raising or lowering of the bracket support block 143 and thus permits specimens of varying sizes to be engaged by the tracer needle 18; and the bearings may also be moved in a horizontal direction so as to compensate for the vertical movement thereof.

In view of the fact that the fulcrum may be moved with a resulting movement change in the lever arm, and the specimen will not always possess the same overall diameter, it is necessary to provide some means for controlling the balance of the arm so that the tracer needle will always gently but positively engage the contour of the specimen. A simple manner of achieving the foregoing is by securing one end of a length of chain 149 to the end of the lever arm remote from the opaque member 106 or to the bracket 108, and coiling the chain around a drum 151 which is secured to a shaft 152, the latter being journaled in panel member 78 and a bracket 153 mounted on the latter. The drum is provided with a knurled hand wheel 154, and by rotating the drum in a counterclockwise direction, additional chain will be unwound from the drum thereby placing a clockwise moment on the lever arm and urging the tracer needle into intimate engagement with the specimen periphery. By thus rotating the drum, the lever arm may be delicately balanced irrespective of the horizontal or vertical positioning of the needle bearings 113, and irrespective of the size of the specimen being tested.

It will be readily understood that due to the permissible change in position of the lever arm fulcrum and the variations in size of the specimen, the distal end of the lever arm and the member 106 will not always be situated in the same vertical position. To compensate for this, I provide lenses 156 mounted in a member 157 which is mounted on and capable of vertical adjustment relative to panel member 78. This adjustment may be made by the utilization of a vertical rack gear 158 mounted on an edge of panel member 78 which is engageable by a pinion gear 159 journaled in the bifurcated member 157 and rotatable from the front side of the members by means of hand wheel 161. Thus, in operation, after the lever arm has been properly adjusted, the hand wheel may be rotated until the upper or lower edge 107 of member 106 is positioned substantially opposite to the horizontal diameter of the lenses, thus insuring the maintaining of the edge in light intercepting positions whether the lever arm is caused to rise or descend during rotation of the specimen.

From the foregoing description, the operation of the mechanism may be understood. After the film 21 is secured to the rear surface of disk 27 and the bullet 16 or other specimen properly mounted, the lever is positioned so that the tracer needle 18 bears on the periphery of the latter. The lenses 156, preferably provided with a focusing handle 162 is then vertically positioned to register with the knife edge 107. By actuating the motor 93, the film and specimen will be simultaneously rotated at a speed of approximately 0.1 revolution per minute and as the tracer needle moves up or down as it follows the bullet periphery, the distal end of the lever arm carrying member 106 will amplify this vertical movement in an amount depending, of course, on the position of the fulcrum of the lever. In any event, movement of the member 106 will effectively block certain portions of the light produced from the light source 19 from entering the lenses, and then, the motion of the knife edge will be further magnified by the lenses, which in combination with the prisms or mirrors, will reflect the light through the slot 41 onto the unexposed film. It will be apparent that when the tracer needle strikes a depression on the bullet, such as that created by the lands of a gun bore, the knife edge 107 will be raised, with a resulting depression 162 appearing on the film due to the vertical shortening of the light rays. Conversely, when the tracer needle is caused to rise by passing over an elevation on the bullet, such as that created by the grooves in the gun bore, the knife edge will be depressed, and a vertically extended light ray will strike the film and expose a greater portion of the film. Irrespective of the irregularities on the specimen, the corresponding elevations and depressions on the film will be properly angularly positioned, and in order to check the accuracy of the produced image, the lenses may be moved until they register with the other of the knife edges and the operator may then rerun the film and specimen, which will produce an image spaced from, but parallel to the previously created image. To facilitate study of the image, the operator may place greater emphasis on its contour by inking or otherwise marking the dividing line between the exposed and unexposed film portions. An indexing line 163 may also be placed on the film for purpose of orientation, and due to the arrangement of parts, the film may be started at any desired radial position, and may be removed, reinserted, or new film substituted therefor without disturbing the set-up of the apparatus and specimen.

It should be clear that by varying the distance between the objective lenses 156 and the prism or mirror 22, the second amplifying phase may be controlled. That is, if the distance therebetween is increased, the so-called "light lever" advantage will be increased with resulting increased vertical magnification, in much the same way as movement of the needle bearings 113 toward the specimen will increase the so-called "mechanical lever" advantage. In the event that the light source is not sufficiently strong, a condensing lens may be interposed between the source and the lever.

The embodiment of my invention as disclosed in Figures 14 through 17 of the drawings is particularly adapted for use in examining relatively flat surfaces for minute irregularities, such as those occasioned by various tools, and by analysis of an amplified graph of such irregularities, it is possible to determine the probability of whether a single tool made the markings on two test specimens. As previously mentioned the apparatus for recording the curved or flat contours are substantially the same, but in the latter case, the reproductions are arranged to be produced on a film strip 171 releasably secured to the periphery of a drum 172 arranged for rotation in a film housing 173. As here shown, the film housing is substantially square in cross-sectional form and is provided with a vertically extending slot 174 on the rear side thereof, the slot being selectively opened or closed by means of a shutter plate 176, similar to the plate 43 in the other embodiment of my invention. The housing is positioned over a base plate 177 by means of suitable brackets 178, and to gain access to the drum and the film thereon, the top cover 179 may be removed, carrying with it a shaft 181 journaled in the cover bearing 182, and as will be understood, this shaft supports the drum within the housing. Shaft 181 extends beyond the upper surface of the cover and is provided with a hand wheel 183 by means of which the drum may be manually rotated so as to bring successive portions of the film in registry with the exposure opening or slot 174, and/or to reset the film to correspond to a particular portion of the contour of the specimen.

The lower end of shaft 181 extends through the bottom of the housing and a pinion 185 is secured thereto in any suitable manner, and the pinion is arranged to be rotated by a worm gear 184 mounted on a horizontally disposed shaft 186. By rotating shaft 186, the drum shaft 181 will also be rotated, and due to the worm and pinion arrangement, the shaft 181 and pinion may be vertically moved and removed from the housing and likewise reinserted and the pinion meshed with the worm gear to be driven thereby. Shaft 186 is mounted for rotation in spaced bearing supports 187 which are secured to base plate 177 and carries a plurality of driven gears 188, each of which is of a different size for a purpose to be hereinafter described.

The specimen to be analyzed is indicated by the numeral 189 and is arranged to be supported in generally parallel relation to the base plate on a movable staging 192, the specimen travelling beneath a tracer arm, such as a needle 193. The staging supports the specimen, and means are provided for horizontally positioning the specimen relative to the tracer needle so as to permit contour analysis along any linear portion of the specimen. Although it would be possible to clamp the specimen to the staging for movement therewith, I prefer to place the specimen on a plate 194 provided with flanges 196 and 197, the flanges being disposed immediately adjacent the rear and a side edge of the specimen. The staging includes a base member 198 supported in vertically adjustable spaced relation to the base plate 177 by means of a threaded stud 199 the latter being vertically movable relative to a support element 201, but vertically fixed to the member 198 in any suitable manner, such as by a screw 202 engageable in a peripheral notch in the stud. It is believed clear, that by rotating the stud with the knurled hand grip 203, the stud will either elevate or depress the member 198 and thus vertically position the specimen. The support element 201 is provided with a dovetailed tongue 205 engageable with a similarly shaped groove 204 formed in a longitudinally extending track 206 which is secured to the base plate, and with this structure, the entire staging may be moved along a predetermined linear path of travel.

To permit the aforesaid horizontal positioning of the specimen, two plates 207 and 208 are placed in superimposed relation over the base member 198. The lowermost plate 207 is mounted in a longitudinal groove 209 provided in the member 198 for bidirectional linear movement relative thereto. The upper plate 208 is likewise mounted in a groove 211 provided in plate 207 for bidirectional linear movement relative to the latter and transverse to the movement thereof. Each of the plates is provided with a rack gear 212 extending along a side thereof, corresponding to its direction of movement, engageable with pinions 213 for actuating the rack gears and moving the plates. By rotating the pinion for the plate 207, plates 207 and 208 will both be moved to the left or right as viewed in Figure 16, while rotation of the pinion for the plate 208 will effect movement of this plate along in a substantially perpendicular direction. Thus, after the specimen is placed on the plate 194, the plate, which is secured to member 208, may be moved in a horizontal plane to position a desired portion of the specimen under the tracer arm or needle.

The tracer arm which includes the needle 193 is supported at the apex of a V-shaped bracket 214 which is mounted on a lever 216, in a manner similar to the lever arrangement of the previously described embodiment of the invention. Here, too, a pair of transversely spaced pivots in the form of needles 217 depend from a bracket 218 secured to the lever, the ends of the needles being supportd by the cup-like bearings 219 mounted on parallel spaced members 221, here shown as angle bars. The latter are superimposed over the staging and are secured to a cross-member 222 mounted on a vertical post or standard 223. The distal end of the lever carries a flat opaque element 224 normally positioned opposite an objective lens 226, the latter being arranged for vertical positioning on a bracket 227 by means of the rack and pinion 228 or in any other manner. As will be understood, and as in the previously described embodiment of the invention, a light source is placed in front of the lever and suitable prisms or mirrors are utilized to direct the light rays from the source, through the lens, and into the slot 174 of the film housing. The fulcrum of the lever 216 formed by the pivot pins is preferably disposed closer to the tracer needle than to the opaque member 224, and in this manner, as the tracer needle moves up and down as it follows the surface irregularities on the specimen, the opaque member will likewise be moved, but to a larger extent, the exact ratio of vertical displacement depending, of course, on the lever length on each side of the fulcrum. Additional vertical magnification is then effected by use of the lens 226 which, with the prisms or mirrors, not shown, serves as a light beam lever, the degree of magnification being dependent on the distance between the lens and mirror, or what may be termed the length of the light lever. To provide proper balance for the mechanical lever arm 216, a length of chain 229 is secured to the end thereof and wound around a drum 231 journaled for rotation in a bracket 232 secured to the post 223. As previously mentioned, permitting a greater or lesser amount of chain to hang from the drum will delicately balance the lever and control the pressure of the tracer needle on the specimen.

The foregoing "mechanical" and "light" levers will provide the vertical amplification on the exposed film while horizontal magnification will depend upon the relative rates of movement of the specimen and rotation of the drum on which the film is mounted. By increasing the rotative speed of the drum, greater horizontal magnification will result, and by properly regulating the drum speed and the length of the "light" lever arm, any reasonable combination of vertical and horizontal magnification is obtainable. Means are provided, in connection with the specimen moving means, for effecting selected variable rates of movement of the specimen and drum. As previously mentioned, the entire staging is supported for lineal movement along the trackway 206, and such movement may be induced in the following manner in order to cause the specimen supported thereon to pass beneath the tracer arm and cause vertical deflection of the latter. Mounted in a pair of longitudinally spaced bearing brackets 233 which are secured to the base plate 177 is a horizontally disposed shaft 234 provided with threads 236 for a substantial portion of its length. The shaft threads are engageable with threads 237 formed in a slot 238 of a block 239, the latter also having a slot 241 for sliding engagement with a support rod 242 secured in the brackets 233. If desired, the block 239 could be secured directly to the staging so that rotation of the shaft 234 would impart lineal motion to the staging and to the specimen thereon. However, I prefer to have the staging movable independently of the shaft rotation, and I therefore utilize the block as a holding or braking means against the pull created by a tension spring 243 secured to a flange 244 of the staging and to a fixed portion of the apparatus, such as to one of the brackets 178. It will be seen that the spring constantly urges the staging toward the right as viewed in Figures 14 and 15 of the drawing, but as the block is in the path of movement of the staging flange 244, further movement of the staging in this direction is prevented until the block is moved by rotation of the threaded shaft 234.

Means are utilized for effecting simultaneous rotation of the shaft 234 and the previously discussed drum rotating shaft 186. A drive shaft 246 provided with a manually operable handle 247, or which may be connected to a small motor, is journaled for rotation in spaced bearing brackets 248, this shaft being placed generally parallel and spaced to shaft 186. At the distal end of shaft 246 is mounted a gear 249 engageable with a similar gear 251 secured to a parallel stub shaft 252. The stub shaft is journaled for rotation in a plurality of spaced bearing brackets 253 and is also provided with a worm gear 254 engageable with a bevel gear 255 on the shaft 234. In this manner, as the drive shaft is rotated, the gears 249 and 251 will cause rotation of the stub shaft 252, and the worm gear arrangement will rotate the shaft 234 permitting the spring 243 to pull the staging under the tracer arm needle. A tubular sleeve 257 is telescopically mounted on the drive shaft 246 and secured to the sleeve are a plurality of spaced pinions 258, here shown as three in number and each possessing a different diametrical size. The sleeve may be moved axially on the drive shaft and as best seen in Figure 15, the pinions are positioned so that a selected one of the latter may be intermeshed with a selected one of the gears 188 on the shaft 186. Thus as the shaft 186 imparts rotation to the film drum, it will be clear that the rotational speed of the latter relative to the lineal speed of the staging may be varied so as to permit a relatively wide range of horizontal magnification as compared to the vertical magnification of the specimen contour. Also, with this arrangement, the gears 258 and 188 may be all placed out of engagement whereby movement of the staging may be effected without rotational movement of the drum.

From the foregoing description of the two embodiments of the invention, the nature of the apparatus and its method of use is believed to be clear. Numerous modifications could be made in the particular construction shown, particularly as to the various driving means and adjustment features, and various other mechanisms could be utilized in the application of the teachings made herein. Also, and by way of example only, a lens could be used adjacent the film housing slot to increase the amount and concentration of the light rays on the film, but it is believed that such types of modifications will be evident to those skilled in the art.

I claim:

1. Apparatus of the character described, comprising means for releasably holding a specimen to be tested, a housing for photographic film including a longitudinally extending slot therein, means in said housing for supporting said film, means for synchronously moving said specimen and said film supporting means, a pivotally mounted lever arm, means secured to said lever arm and engageable with the surface of said specimen as the latter is moved relative thereto, a light source from which light rays may strike said film, and opaque means on said lever arm interposed between said light source and said slot whereby as said lever arm is rocked about its said pivotal mounting selected portions of said light rays will be intercepted thereby.

2. Contour analysis mechanism comprising means for supporting an object to be analyzed, tracing means engageable with the surface of said object as the latter is moved relative thereto, means for moving said object relative to said tracing means, a lever arm secured to said tracing means, means for pivotally supporting said lever whereby movement of said tracing means will effect pivotal movement of said lever arm, a sheet of photographic film, a housing for said film having a slot therein, means for moving said film in timed relation to movement of said object, and a light source from which said film may be exposed, said lever arm being disposed intermediate said light source and said film whereby movement of said lever arm will intercept varying portions of said light.

3. Apparatus for reproducing contours of an object on photographic film, comprising a housing for said film having a longitudinally extending slot therein, the surface of said film being disposed adjacent said slot, means for moving said film past said slot and aligning successive portions of the film therewith, means for supporting said object, means for moving said object in synchronism with the movement of said film, a lever member pivotally supported and including a tracer arm engageable with the surface of said object and arranged to follow the surface irregularities as the object is moved, a light source, means for directing light rays from said source through said slot and onto said film for exposing the latter, and said lever including a portion positioned intermediate said light source and said slot whereby as said lever is pivoted said slot will receive light rays along varying portions of its length, the length of such rays along said slot being related to the movement of said tracer arm over the object.

4. Apparatus as set forth in claim 3 in which said pivotal support for said lever arm is located closer to said tracer arm than to said light intercepting position whereby movement of said arm will be amplified by the latter portion.

5. Apparatus for recording minute contour variations of an object on photographic film, comprising a film housing having a longitudinally extending slot disposed adjacent a surface of said film, means for moving said film past said slot within the housing, means for supporting said object and moving the latter in synchronism with said film, a lever arm pivotally supported intermediate the ends thereof and overlying said object, a tracer point secured to said lever on one side of said pivotal support with the distal end thereof in intimate engagement with the surface of said object, a light source, means for directing light rays from said source through said slot and onto said film, and opaque means on said lever on the other side of said pivotal support interposed between said light source and said slot, said opaque member being positioned to intercept portions of said rays and permit light rays to pass through only a portion of the length of said slot.

6. Apparatus as set forth in claim 5 including means secured to the lever adjacent the end thereof remote from said opaque member for selectively varying the pressure of said tracer point on said specimen, and means for selectively varying the spacing of said pivotal support relative to said tracer arm and to said opaque member.

7. Apparatus for reproducing contours of an object on photographic film, comprising a housing for said film having a longitudinally extending slot therein, a film supporting member within said housing for positioning the surface of said film adjacent said slot, means for moving said member past said slot and aligning successive portions of the film therewith, means for supporting said object, means for moving said object in synchronism with the movement of said film support member, a lever member pivotally supported and including a tracer arm engageable with the surface of said object and arranged to follow the surface irregularities as the object is moved, a light source, means for directing light rays from said source through said slot and onto said film for exposing the latter, and said lever including a portion positioned intermediate said light source and said slot, a lens interposed between said lever portion and said slot for receiving portions of said light rays unintercepted by said lever portion, said lens emitting light rays toward said slot proportional to the movement of the lever.

8. Apparatus of the type described for reproducing surface contours of an object having a generally circular cross-sectional form on a sheet of photographic film, comprising means for holding and rotating said object, a lever arm pivotally mounted and having a portion thereof engageable with the peripheral surface of said object whereby as the object is rotated the lever arm will move in response to the elevations and depressions on said surface, means for synchronously rotating said object and said film sheet, a light source for directing rays of light toward said film, and means on said lever arm interposed in the path of said light rays for intercepting a portion of said rays in proportion to the movement of said lever.

9. Apparatus for reproducing surface contours of an object having a substantially circular cross-sectional form on a sheet of photographic film or the like, comprising a film housing having a vertically extending slot, means in said housing for supporting said film with radial portions of the surface thereof adjacent said slot, means for rotating said film past said slot, means for supporting and rotating said object around a generally horizontal axis, a substantially horizontal lever, a tracer arm depending from said lever and engageable with the peripheral surface of the object, means for pivotally supporting said lever adjacent said tracer arm, a light source from which light rays may enter said slot for substantially the greater portion of its length, said lever including an opaque portion interposed between said light source and said slot, said portion being spaced at a greater distance from said pivotal support than said tracer arm whereby vertical movements of the latter will be amplified, and said portion being arranged to move in a generally vertical direction so as to vary the vertical portion of the slot exposed to the light rays.

10. Apparatus as set forth in claim 9 in which means are provided for selectively varying the distance between said lever pivotal support and said tracer arm and for vertically adjusting the height of the latter, and means for varying the moment on said lever whereby said lever arm will be gently but positively engaged with the surface periphery of said object.

11. Apparatus for amplifying surface variations of an object having a substantially circular cross-sectional form and reproducing the same on a sheet of photographic film, comprising a light source, means for rotating a surface of said film past said light source whereby sequential radial portions thereof will be aligned with light rays from said source, means for rotating said object in synchronism with said film, a tracer arm arranged for generally vertical movement and having the distal end thereof in engagement with the peripheral surface of said object as the latter is rotated, a pivotally supported lever arm carrying said tracer arm and movable in response to motion of the latter, said lever arm including an opaque portion disposed at a greater distance from said pivotal support than said tracer arm interposed in the path of a portion of said light rays for selectively varying the radial length of said exposed film portions in proportion to movement of said tracer arm.

12. Apparatus for amplifying surface variations of an object having a substantially circular cross-sectional form and reproducing the same on a sheet of photographic film, comprising a light source, means for rotating a surface of said film past said light source whereby sequential radial portions thereof will be aligned with light rays from said source, means for rotating said object in synchronism with said film, a tracer arm constantly engageable with the peripheral surface of said object as the latter is rotated and movable in a generally vertical direction in response to surface irregularities on the object, a substantially horizontally disposed lever arm mounted for pivotal movement and connected to said tracer arm, said lever arm including an opaque portion in the path of said light rays, and lens means intermediate said opaque portion and said film for amplifying the vertical movement of the latter and selectively exposing greater and lesser radial portions of said film to said light rays.

13. Apparatus for amplifying surface variations of an object having a substantially circular cross-sectional form and reproducing the same on a sheet of photographic film, comprising a substantially enclosed housing for said film and having a longitudinally extending slot therein, means for supporting said film including a horizontally disposed shaft, said housing having an upper and lower section, the said sections being separable in a plane substantially coinciding with the axis of said shaft, matching bearing means on each of said sections whereby said shaft and film may be removed from said housing, a second shaft in substantial axial alignment with said first mentioned shaft, means carried by said second shaft for releasably supporting said object, means operatively engaged with said shafts for simultaneous rotation of the shafts, said clutch means permitting removal of said first shaft from the housing, means for adjusting the axial centerline of said object relative to said second shaft, a generally horizontally disposed lever, pins for pivotally supporting said lever intermediate the ends thereof, a tracer arm adjacent said pins and depending from said lever for intimate engagement with the periphery of said object, a light source for directing light rays substantially perpendicularly to and for substantially the entire length of said housing slot, and an opaque member carried by said lever interposed between said light source and said film for intercepting a portion of said light rays and varying the length of the slot exposed to said rays.

14. Apparatus as set forth in claim 13 in which means are provided for selectively positioning said pivotal support for said lever in a vertical and horizontal direction, and means independent of said last named means for varying the moment on said lever.

15. Apparatus for reproducing contour irregularities of a specimen on photographic film, comprising a film housing having a longitudinal slot therein for admission of light to the film, means for supporting and moving said film past said slot, means for supporting said specimen, a pivotally supported lever including a tracer arm engageable with a surface of said specimen, means for moving said specimen along a substantially lineal path past said tracer arm in synchronism with said film moving means, a light source for emitting light rays toward said film housing slot, and said lever including an opaque portion disposed in the path of a portion of said light rays and movable with the lever.

16. Apparatus for reproducing contour irregularities of a specimen on photographic film, comprising a film housing having a vertically disposed slot on a wall thereof whereby light may enter the interior of the housing, a drum journaled for rotation about a substantially vertical axis in said housing for supporting said film, horizontally disposed staging means for supporting said specimen, a substantially horizontal lever pivotally supported in superimposed relation to said specimen, said lever having a tracer arm engageable with the surface of said specimen and an opaque portion spaced therefrom, means for moving said staging along a substantially horizontal lineal path, means for urging said tracer arm into intimate contact with said surface as the specimen is moved beneath the arm, a light source for directing rays of light toward said housing slot for exposure of the film in the housing, said opaque lever portion being movable with said lever and disposed between said light source and said film to intercept vertical components of said light rays, and means for rotating said drum in synchronism with the movement of said staging.

17. Apparatus as set forth in claim 16 in which means are provided for selectively varying the ratio of rotational speed of said drum relative to the rate of movement of the staging.

18. Apparatus for amplifying surface variations of an object having a substantially flat surface and reproducing the same on a sheet of photographic film, comprising a light source, means for supporting and moving a surface of said film past said light source whereby sequential portions thereof will be aligned with light rays from the source, means for moving said object along a substantially horizontal lineal path in synchronism with movement of said film supporting and moving means, a tracer arm arranged for generally vertical movement and having the distal end thereof in engagement with the surface of said object as the latter is moved therebeneath, a pivotally supported lever carrying said tracer arm and rockable in response to movement of the latter, and said lever including an opaque portion spaced from the pivotal support of said lever and mounted for movement with the latter, said opaque portion being disposed in the path of a portion of said light rays for selectively varying the length of said sequential film portions exposed to said light rays.

19. Apparatus as set forth in claim 18 including lens means disposed between said opaque member and said film, said lens means being in the path of light rays from said source and vertically amplifying the portions of said rays unintercepted by the opaque member.

20. Apparatus of the character described including means for supporting a specimen to be tested, a film housing having a longitudinally extending slot therein, means for supporting photograph film in said housing, means for synchronously moving said specimen and said film supporting means, a pivotally mounted lever arm having a portion thereof engageable with the surface of said specimen as the latter is moved relative thereto, a light source from which light rays may enter said housing slot, and opaque means on said lever arm interposed between said light source and said slot for intercepting portions of said light rays in proportion to movement of said lever arm.

References Cited in the file of this patent

UNITED STATES PATENTS

| Number | Name | Date |
| --- | --- | --- |
| 2,048,154 | Abbott | July 21, 1936 |
| 2,460,726 | Arndt | Feb. 1, 1949 |
| 2,538,029 | Munger | Jan. 16, 1951 |

FOREIGN PATENTS

| Number | Country | Date |
| --- | --- | --- |
| 547,462 | Great Britain | Aug. 28, 1942 |
| 717,837 | Germany | Feb. 24, 1942 |
| 964,293 | France | Jan. 25, 1950 |